United States Patent [19]

Satomi et al.

[11] 3,901,680

[45] Aug. 26, 1975

[54] COMBINED HERBICIDE

[75] Inventors: Takeo Satomi, Nishinomiya; Naganori Hino, Toyonaka, both of Japan

[73] Assignee: Sumitomo Chemical Company, Limited, Osaka, Japan

[22] Filed: June 18, 1973

[21] Appl. No.: 370,760

[30] Foreign Application Priority Data
June 23, 1972 Japan................... 47-63514

[52] U.S. Cl............................ 71/87; 71/93
[51] Int. Cl.²......................... A01N 9/22
[58] Field of Search................... 71/93, 87

[56] References Cited
UNITED STATES PATENTS
3,636,143  1/1972  Schrader et al................ 71/87

OTHER PUBLICATIONS
Pfeiffer, Chem. Abst., Vol. 65, (1966), 6219b.

*Primary Examiner*—Lewis Gotts
*Assistant Examiner*—Catherine L. Mills
*Attorney, Agent, or Firm*—Wenderoth, Lind & Ponack

[57] ABSTRACT

Herbicidal compositions are provided herein containing 0-methyl or 0-ethyl-0-(3-methyl-6-nitrophenyl)-N-secondary-butyl-phosphorothioamidate, a sym-triazine herbicide represented by the formula:

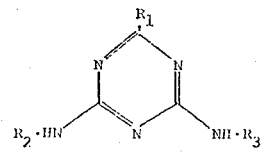

wherein $R_1$ represents a chlorine atom, a methoxy group or a methylthio group, and $R_2$ and $R_3$ each represent an ethyl group or an isopropyl group and a herbicidally acceptable inert carrier.

7 Claims, No Drawings

COMBINED HERBICIDE

The present invention relates to a herbicidal composition of a mixture of O-methyl-O-(3-methyl-6-nitrophenyl)-N-secondary-butylphosphorothionoamidate (hereinafter referred to as the compound (A) or O-ethyl-O-(3-methyl-6-nitrophenyl)-N-secondary-butylphosphorothionoamidate (hereinafter referred to as the compound (B) and a sym-triazine herbicide represented by the general formula:

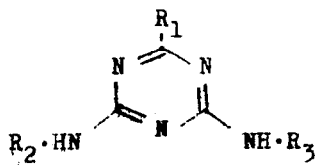

wherein $R_1$ represents a chlorine atom, a methoxy group or a methylthio group, and $R_2$ and $R_3$ each represent an ethyl group or an isopropyl group, the herbicidal composition displaying remarkable synergistic effects, which are far superior than the effects achieved by the individual components. Symetrine, one of the various herbicides for a rice plant, is especially effective for broad-leaved weeds [i.e., monochoria (*Monochoria viaginalis Presl*), false pimpernel (*Linderna pyxidaria*), tooth cup (*Rotala indica Koehne*)], but on the other hand has very little herbicidal effects on grassy weeds, and has little herbicidal effects on perennial weeds [i.e., perennial nutsedge sp. (*Cyperus serotinus*), arrowhead sp. (*Sagittaria pygmaea*), hardstem bulrush (*Scirpus Juncoides*)].

Each compound A and B has particularly prominent herbicidal activity in respect to grassy weeds [i.e., barnyard grass (*Echinochloa crus-galli*)], but has little herbicidal effect in regard to broad-leaved weeds [i.e., manochoria (*Monochoria viaginalis Presl*), false pimpernel (*Linderna pyxidaria*), tooth cup (*Rotala indica Koehne*)] at their large stage, and moveover has little herbicidal effects on perennial weeds [i.e., perennial nutsedge sp. (*Cyperus serotinus*), arrowhead sp. (*Sagittaria pygmaea*), hardstem bulrush (*Scirpus Juncoides*)].

As a result of extensive studies, the present inventors have found that mixtures containing one of triazine compounds and the compound A or compound B have very excellent herbicidal activities both in regard to broad-leaved weeds and to grassy weeds, and particularly to perennial weeds which are not controlled by herbicidal compositions consisting of symetrine, compound A or compound B.

The above facts show that the present combined herbicides have better advantages than the individual herbicides.

As a rule, a herbicide which does not kill all the weeds in question is not economical. For instance, if certain weeds survive they will propagate and inflict damage on the crops which is highly disadvantageous from an economical standpoint. Accordingly, it is desirable that herbicides have a wide herbicidal spectrum, i.e., properties capable of killing a wide variety of weeds. Because of the recent labor insufficiency, it is diserable to develop herbicides which are be highly effective against all weeds in a single application.

We have been working for the development of excellent herbicides. The organic phosphorous compounds A or B, discovered by the present inventors, each exhibits a powerful herbicidal effect on the growth of most weeds by pre-emergence treatment. By postemergence treatment, however, the herbicidal effect is weakened as weeds grow larger. Particularly the effect on broad-leaved weeds is sharply reduced, and the herbicidal spectrum becomes narrow. Thus, these compounds are herbicides having a narrow range regarding the suitable period of treatment. Although we have studied mixed agents of each of these compounds with various other herbicides to obviate such defects, most of these combinations exhibited a mere additive effect of offsetting effect. However, the combination of A or B with 2-methylthio-4,6-bis(ethylamino)-s-triazine (hereinafter abbreviated as symmetrine) which is one of the sym-triazine compounds of the present invention, gave very good results. Thereafter, in studying symmetrine derivatives, we have found that mixtures of A or B with a sym-triazine compound represented by the above-mentioned general formula, similarly to the mixture with symmetrine, exhibited surprising synergistic herbicidal effects. Examples of such sym-triazine compounds are:

1. 2-chloro-4,6-bis(ethylamino)-s-triazine,
2. 2-chloro-4,6-bis(isopropylamino)-s-triazine,
3. 2-methylthio-4,6-bis(ethylamino)-s-triazine,
4. 2-methylthio-4,6-bis(isopropylamino)-s-triazine,
5. 2-methylthio-4-ethylamino-6-isopropylamino-s-triazine,
6. 2-methoxy-4-ethylamino-6-isopropylamino-s-triazine, etc.

These sym-triazine compounds are described in Japanese Patent Publication Nos. 9799/1960, 16600/1960 and 10799/1961 and are known as herbicides. As their principal characteristics, these compounds exhibit high efficacy in pre-emergence treatment, high efficacy for broad-leaved weeds and somewhat less efficacy for Graminaceae weeds, and are characterized by slow action, etc.

Results obtained by using mixtures agents of symmetrine with compound A or B are shown by way of an example. According to the results, the present mixtures of symmetrine and compound A or compound B show excellent herbicidal activity as well as little phytotoxicity on rice plants. Therefore the combined herbicides exhibit the best characteristics as a herbicide. On the 18th day after rice planting in a rice field, the field was treated with the following mixture agents and on the 30th day after the treatment the herbicidal efficacy was assessed. The results are shown in Table 1.

Table 1

| Amount of symmetrine used (active ingredient grams/are) | Dry weight of the remaining weeds in the treated area to that in the untreated area (%) | | | | | |
|---|---|---|---|---|---|---|
| | Amount of Compound A used (active ingredient grams/are) | | | Amount of Compound B used (active ingredient grams/are) | | |
| | 8 | 4 | 0 | 8 | 4 | 0 |
| 4 | 5 % | 12 % | 57 % | 4 % | 9 % | 57 % |
| 2 | 10 | 33 | 72 | 9 | 28 | 72 |
| 0 | 27 | 48 | 100 | 22 | 41 | 100 |

These results were analyzed by the method of Colby mentioned in Weeds, vol. 15, pages 20 – 22. In the Colby's method, when the expected value calculated by the formula:

$$\text{Expected value from the mixture agent (\%)} = \frac{\text{Observed value from } X \text{ agent only (\%)} \times \text{Observed value from } Y \text{ agent only (\%)}}{100}$$

is larger than the observed value from the mixture agent, it is judged that there is a synergistic effect. According to this formula, in the mixed use of 8 g./are of the compound A and 4 g./are of symmetrine, for example, the results are $$\text{Expected value} = \frac{27 \times 57}{100} = 15\ \%$$
$$\text{Observed value} = 5\ \%,$$

and therefore the expected value is larger than the observed value. Also, in the mixed use of 8 g./are of the compound B and 4 g./are of symmetrine, the Expected value = 13 % and the Observed value = 4 %, and therefore the expected value is larger than the observed value. Accordingly, it is judged that there is an evident synergistic effect. Also, in herbicidal experiments for upland field weeds, an evident synergistic effect was observed particularly when weeds were treated during the growth period.

Although the reason for this synertistic effect is not known for certain, the following supposition may be possible: In the case of treatment before germination of weeds, the organic phosphorous compound A or B, which is one of the components of the composition according to the present invention, has a powerful herbicidal effect essentially non-selectively on all weeds. However, once weeds have grown, it is considered, that the resistant weeds have a certain recovering means to weaken the efficacy of the agent, but the sym-triazine compound hinders the recovery by such a manner as to lessen the energy supply of this recovery means. Thus, by the mixed use of these two kinds of compounds a powerful synergetic action can be produced.

As explained above, the mixed compositions of the compound A or B and the sym-triazine compounds display a remarkable synergetic effect by strengthening the herbicidal effect of the respective components. This synergetic effect not only strengthens the herbicidal effect but also enlarges the range of the herbicidal spectrum and the suitable period of treatment, shortens the time required to kill weeds, and increases the selectivity for crops than weeds by varying the mixing ratio. Thus, the present invention is very useful from the viewpoint of agriculture.

The areas to which the herbicidal compositions according to the present invention can be applied include fields of rice and other cereals, beans, vegetables, orchards, turfs, fields of wood plant seedlings and non-farming areas, and in any of these places the herbicidal compositions of the present invention display excellent herbicidal action.

In the actual use of the herbicidal compositions according to the present invention, they can be used in any form of granules, wettable powders, emulsifiable concentrates, fine granules, dusts, etc. The suitable mixing ratio of the two kinds of compounds is 1 weight part of the compound A or B to 0.1 – 5.0 weight parts of the sym-triazine compound represented by the above-mentioned general formula.

In the actual preparation of the compositions, the solid carriers used are, for example, talc, bentonite, clay, kaolin, diatomaceous earth, vermiculite, slaked lime, etc.; the liquid carriers are, for example, benzene, alcohols, acetone, xylene, methylnaphthalene, dioxane, cyclohexanone, etc.; and the emulsifiers are, for example, alkylsulfates, alkylsulfonates, polyethylene glycol ethers, polyhydric alcohol esters, etc.

Examples of formulations containing the herbicidal compositions according to the present invention are shown in the following:

Formulation Example 1

20 weight parts of the compound A, 10 weight parts of 2-chloro-4,6-bis(ethylamino)-s-triazine, 5 weight parts of a polyethylene acetylarylester surface active agent and 65 parts of talc are throughly ground and mixed to produce a wettable powder.

Formulation Example 2

20 weight parts of the compound B, 5 weight parts of 2-methylthio-4,6-bis(isopropylamino)-s-triazine, 10 weight parts of a polyethylene glycol ether active agent, 25 weight parts of cyclohexanone and 40 weight parts of xylene are intimately mixed to obtain an emulsifiable concentrate.

Formulation Example 3

7 weight parts of the compound B, 1.5 weight parts of 2-methylthio-4,6-bis(ethylamino)-s-triazine, 5,5 weight parts of a salt of lignin sulfonic acid, 86 weight parts of clay are thoroughly ground and mixed, and intimately kneaded with water. The mixture is formed into granules and then dried to obtain a granular agent.

The invention is explained in further detail by the following examples, but not restricted thereto.

EXAMPLE 1

A concrete pot, 50 cm. × 50 cm. in size, placed outdoors was filled with rice field soil and water was added to the soil to make it rice field-like. Rice seedlings at the five-leaves stage were transplanted to the soil. On the 15th day after the transplanting, the water-covered soil was treated with the granules produced according to Formulation Example 3 at the rate of 300 grams/are. On the 30th day after the treatment, the weeds were pulled out and the dry weight was measured. The ratio of this dry weight to the dry weight of weeds in the untreated area are shown in Table 2. The weeds which naturally occurred were *Echinochoa crusgalli* Beauv., *Monochoria vaginalis* Presl, *Dopatrium junceum* Ham., *Rotala indica* Koehne, *Lindernia pyxidaria* L., *Cyperus compressus* L., *Eleocharis acicularis* R. Br., etc. The herbicidal efficacy and the phytotoxicity were evaluated and the markings were represented by the numerals from 0 to 10 as shown in the following:

|  | Action on plants |
|---|---|
| 0 | same as in the untreated area |
| 1 – 2 | very slight |
| 3 – 4 | slight |
| 5 – 6 | medium |
| 7 – 8 | heavy |
| 9 – 10 | extremely heavy |

In Table 2 the sym-triazine compounds are shown by the numbers given to the previously exemplified compounds.

Table 2

| Compounds tested and amounts of application (g./are) | | Herbicidal efficary on | | |
|---|---|---|---|---|
| Sym-triazine compound | Compound A or B | Phyto-toxicity on rice | Barnyard grass | Broad-leaved weeds |
| (1), 3 g. | + A, 10 g. | 2 | 10 | 10 |
| (1), 3 g. | + B, 10 g. | 2 | 10 | 10 |
| (1), 3 g. |  | 3 | 2 | 6 |
| (3), 4 g. | + A, 10 g. | 0 | 10 | 10 |
| (3), 4 g. | + B, 10 g. | 0 | 10 | 10 |
| (3), 4 g. |  | 0 | 2 | 6 |
| (4), 4 g. | + A, 10 g. | 1 | 10 | 9 |
| (4), 4 g. | + B, 10 g. | 1 | 10 | 9 |
| (4), 4 g. |  | 1 | 2 | 6 |
| (6), 4 g. | + A, 10 g. | 2 | 10 | 9 |
| (6), 4 g. | + B, 10 g. | 2 | 10 | 9 |
| (6), 4 g. |  | 2 | 2 | 6 |
|  | A, 10 g. | 0 | 7 | 3 |
|  | B, 10 g. | 0 | 7 | 3 |

EXAMPLE 2

A concrete pot of 50 cm. × 50 cm. placed outdoors was filled with paddy field soil, and water was added thereto to make it paddy field-like. Then fourth-leaf period rice plant seedlings, third or fourth-leaf period Cyperus serotinus, Sagittaria pygmaea and Sepipus Juncoides were transplanted thereto and, furthermore, tubers of Sagittaria Pygmaea and Cyperus serotinus were planted therein. On the 12th day after the rice-transplanting, water-flooded soil treatment was conducted using the granules prepared by the same way as the Formulation Example 3 at the rate of 300 g./are. On the 30th day after the treatment the weeds were pulled out and the dry weight was measured. The ratio of this dry weight to the dry weight of weeds in the untreated area are shown in Table 3. The herbicidal efficacy and the phytotoxicity were evaluated and the markings were represented by the numerals from 0 to 10 as shown in Example 1.

In Table 3 the sym-triazine compounds are shown by the numbers given to the previously exemplified compounds.

Table 3

| Compound tested and amounts of application (g./are) | | Herbicidial efficacy on | | | |
|---|---|---|---|---|---|
| Sym-triazine compound | Compound A or B | Phyto-toxicity on rice | Cyperus sero-tinus | Sagit-taria pygmaea | Sepipus Jun-coides |
| (1), 3 g. | + A, 10 g. | 3 | 8 | 8 | 8 |
| (1), 3 g. | + B, 10 g. | 2 | 7 | 8 | 7 |
| (1), 3 g. |  | 4 | 0 | 2 | 0 |
| (3), 4 g. | + A, 10 g. | 0 | 9 | 8 | 9 |
| (3), 4 g. | + B, 10 g. | 0 | 8 | 8 | 9 |
| (3), 4 g. |  | 0 | 0 | 2 | 0 |
| (6), 4 g. | + A, 10 g. | 3 | 8 | 8 | 8 |
| (6), 4 g. | + B, 10 g. | 3 | 7 | 8 | 8 |
| (6), 4 g. |  | 3 | 0 | 2 | 0 |
|  | A, 10 g. | 0 | 1 | 1 | 1 |
|  | B, 10 g. | 0 | 1 | 0 | 1 |

What we claim is:

1. A herbicidal composition comprising an inert carrier and as an essential ingredient, a herbicidally effective amount of a mixture of (A) O-methyl-or (B) O-ethyl-O-(3-methyl-6-nitrophenyl)-N-secondary-butyl-phosphorothioamidate and a sym-triazine herbicide represented by the formula:

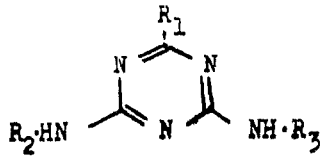

wherein $R_1$ represents a chlorine atom, methoxy group or methylthio group, and $R_2$ and $R_3$ each represents an ethyl group or an isopropyl group, the mixing weight ratio of the phosphorothioamidate compound A or B to the sym-triazine being 1 to 0.1 –0.5.

2. A herbicidal composition of claim 1, wherein the mixture contains as active ingredients O-ethyl-O-(3-methyl-6-nitrophenyl)-N-secondary-butylphosphorothioamidate and a sym-triazine of the formula;

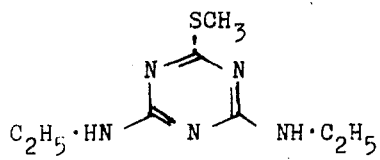

3. A herbicidal composition of claim 1, wherein the mixture contains as active ingredients O-methyl-O-(3-methyl-6-nitrophenyl)-N-secondary-butylphosphorothioamidate and a sym-triazine of the formula;

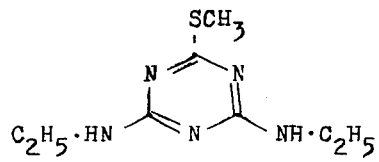

4. A herbicidal composition of claim 1, wherein the composition is in a form of emulsifiable concentrate, wettable powder, granule, dust, oil spray or aerosol.

5. A method for controlling weeds, which comprises applying a herbicidal composition comprising an inert carrier and as an essential ingredient, a herbicidally effective amount of a mixture of (A) O-methyl-or (B) O-ethyl-O-(3-methyl-6-nitrophenyl)-N-secondary-butyl-phosphorothioamidate and a sym-triazine herbicide represented by the formula:

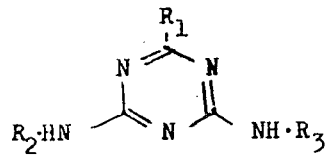

wherein $R_1$ represents a chlorine atom, methoxy group or methylthio group, and $R_2$ and $R_3$ each represents an ethyl group or an isopropyl group, the mixing weight ratio of the phosphorothioamidate compound A or B to the sym-triazine being 1 to 0.1 – 0.5.

6. A method of claim 5, wherein a composition contains as active ingredients O-ethyl-O-(3-methyl-6- nitrophenyl)-N-(sec)-butylphosphorothioamidate and a (sym)-triazine of the formula:
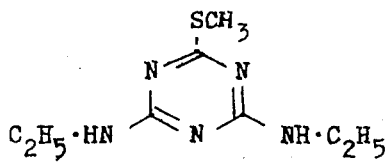
7. A method of claim 5, wherein a composition contains as active ingredients O-methyl-O-(3-methyl-6-nitrophenyl)-N-(sec)-butylphosphorothioamidate and a (sym)-triazine of the formula;
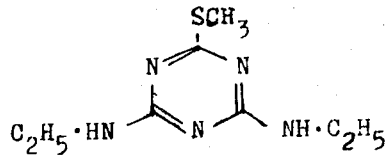
* * * * *